United States Patent
Bertelle et al.

(10) Patent No.: US 6,929,286 B2
(45) Date of Patent: Aug. 16, 2005

(54) ENERGY ABSORBING TURNING LOOP COVER

(75) Inventors: Lance Bertelle, Windsor (CA); Michael L. Goatley, Lake Orion, MI (US); Daniel E. Crimmins, Holly, MI (US); James N. Sonnenberg, Royal Oak, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/228,363

(22) Filed: Aug. 26, 2002

(65) Prior Publication Data

US 2004/0036268 A1 Feb. 26, 2004

(51) Int. Cl.⁷ .......................... B60R 22/00; B60R 22/28
(52) U.S. Cl. .................... 280/808; 280/801.1; 280/805; 296/187.05
(58) Field of Search .............................. 280/808, 801.1, 280/801.2, 805; 296/187.05; 297/470–472, 483

(56) References Cited

U.S. PATENT DOCUMENTS

| | | | |
|---|---|---|---|
| 4,579,368 A | * | 4/1986 | Kawade et al. .......... 280/801.2 |
| 5,529,344 A | | 6/1996 | Yasui et al. .................. 280/808 |
| 5,601,311 A | * | 2/1997 | Pfeiffer et al. ........... 280/801.1 |
| 5,685,566 A | * | 11/1997 | Hirase et al. ............ 280/801.1 |
| 5,746,449 A | | 5/1998 | Hiroshige ................... 280/808 |
| 5,863,071 A | | 1/1999 | Li-Calso .................. 280/801.1 |
| 6,106,012 A | * | 8/2000 | Boegge et al. ........... 280/801.1 |
| 6,126,230 A | | 10/2000 | Ikeda et al. ................. 296/189 |
| 6,168,206 B1 | | 1/2001 | Greib et al. ................ 280/808 |
| 6,273,469 B1 | * | 8/2001 | Kwaske et al. ............. 280/805 |

FOREIGN PATENT DOCUMENTS

EP          0 180 306 A2 *  8/1985

* cited by examiner

*Primary Examiner*—Ruth Ilan
(74) *Attorney, Agent, or Firm*—Sally J. Brown (57) ABSTRACT

A turning loop cover is disclosed that is configured to slidably engage a turning loop and a fastener of a seatbelt system. The turning loop cover is primarily formed of a housing that has an internal volume and a first surface wherein a plurality of ribs extend from the first surface into the internal volume. The ribs are configured to attenuate a force acting upon the first surface of the housing.

20 Claims, 4 Drawing Sheets

ENERGY ABSORBING TURNING LOOP COVER

BACKGROUND OF THE INVENTION

1. Field of the Invention

The present invention relates to automotive safety. More specifically, the present invention relates to turning loop covers with energy-absorbing characteristics.

2. Technical Background

According to the National Highway Traffic Safety Administration (NHTSA), in 1999 over 32,000 automobile occupant fatalities occurred in the United States. While these numbers are unacceptably high, the NHTSA estimated that more than 12,500 lives were saved from potentially fatal car accidents by seatbelts and airbags usage. With the apparent success of seatbelts and airbags, the United States government and the automobile industry have sought to improve current automobile safety features as well as introduce new safety devices.

A basic safety feature of automobiles is the seat belt. Seat belts are located in every seating position of an automobile to restrain the occupants during impacts and sudden movements. In order to allow for maximum restraint of automobile occupants, outboard seating positions have a shoulder belt to provide restraint for the occupant's upper body. Even seat belts located in middle seats are increasingly using shoulder belts. The combination of lap and shoulder belts limit the motion of the automobile occupants and prevents them from being ejected from the automobile or impacting the dashboard or the back to forwardly located seats.

The lap and shoulder belts are typically a single belt with three anchor locations. The first anchor location is often the end of the fabric belt that is anchored to the floor or other automobile structure. From the first anchor point, the belt lays across the occupant's lap where the belt is slidably anchored by a latch plate that is removably connected to a buckle. The buckle is anchored to the automobile structure. From the second anchor location, the latch plate redirects the belt across the occupants shoulder and through a turning loop.

The turning loop functions to guide the belt from over the shoulder of the occupant, down to the third anchor location. The third anchor location is typically a retractable seat belt storage device that retracts the slack of the belt as well as anchors the belt to the automobile structure. This type of seatbelt system helps prevent the occupant from being thrown from the automobile and limits the motion of the occupant within the automobile. However, because the turning loop guides the seatbelt as is lays across the occupant's shoulder, it is also in a position to be struck by the occupant's head. This can injure the occupant because of the rigid material that comprises the turning loop and the fastener.

In order to mitigate possible injury that could be caused by a head impacting the turning loop and fastener, turning loop covers have been created to limit the amount of injury that may be caused by the turning loop. The turning loop cover is typically a plastic cover that is placed over the turning loop and the fastener to limit injury to the occupant. It is designed to disperse the energy of an automobile occupant's head propelled toward a turning loop, as might occur in an automobile accident.

A turning loop cover encloses the turning loop and the fastener. Turning loop covers may also incorporate energy-absorbing members that are capable of absorbing a portion of the kinetic energy of the occupant's head, thus limiting the injury to the occupant. Energy absorption can be accomplished though a large number of devices that are capable of being placed in a turning loop cover. In general, compression and torsional energy-absorbing members are most apt for turning loop cover applications because of the type of compression impacts that are expected on turning loops. Some examples of energy-absorbing devices are springs, bellows, buckling ribs, deflection walls, and flexing brackets for compressive force attenuation and bellows, bending turning loops, and rubber filled covers for bending forces.

These energy-absorbing members require a method of coupling the turning loop cover and energy-absorbing member to the turning loop and the fastener. Several problems exist in fastening a turning loop cover to a turning loop and fastener. One problem is that the energy absorbing members often dictate the shape and size of the turning loop cover. This makes modifications difficult and expensive. It would be desirable to easily introduce new designs of energy-absorbing members without significantly changing the turning loop cover.

Another problem with current turning loop cover designs is the difficulty of assembling the components and the associated assembly costs. Presently, many turning loop covers require complex and time consuming processes for installation of the cover. In some turning loop cover designs, the turning loop cover must be installed at the same time as the fastener. Thus, it is necessary to preassemble the turning loop cover, the turning loop, and the fastener. This requires additional unnecessary steps in the assembly process which increases assembly cost and assembly time. Further, the preassembled turning loop cover must maintain the proper configuration throughout assembly. The assembler must hold the fastener and turning loop cover configurations while trying to fasten the fastener to the automobile structure. Alternatively, the assembly process may require a jig to maintain the preassembled configurations. A jig would introduce further costs and steps.

Additionally, current turning loop cover designs also have difficulties with cover replacement. If special tools are required for assembly, these tools will also be required for replacement of the turning loop cover. The necessity for the tools will limit the number of locations that can service and repair what should be a relatively simple component. Further, the complexity of assembling the fastener and the turning loop to the automobile structure may allow for assembly errors.

Furthermore, some designs do not securely attach the turning loop cover to the turning loop and fastener. The turning loop cover may have a degree of tolerance whereby it may shift around the turning loop and fastener. The unsecure attachment may cause the turning loop cover to rattle as the automobile is in motion, causing an annoyance and distraction to the automobile occupants. Even more serious, if the turning loop cover is not properly aligned to the turning loop and fastener, the energy absorbing member of the turning loop cover may not correctly align. A misalignment could prevent the energy absorbing members from dispersing the energy of an occupant's head, resulting in increased injury to the occupant.

Accordingly, a need exists for a turning loop cover that can be assembled quickly and cost effectively. There is also a need for a turning loop cover that is capable of being assembled independently of the turning loop and fastener. The turning loop cover should also be capable of securely attaching to the turning loop and fastener to eliminate rattling and incorrect alignment.

BRIEF SUMMARY OF THE INVENTION

The apparatus of the present invention has been developed in response to the present state of the art, and in particular, in response to the problems and needs in the art that have not yet been fully solved by currently available turning loop covers. Thus, it is an overall objective of the present invention to provide a turning loop cover that is slidably and independently attachable to a turning loop as well as capable of producing a compressive load on the turning loop.

To achieve the foregoing objective, and in accordance with the invention as embodied and broadly described herein, an energy-absorbing turning loop cover is provided. The turning loop cover may comprise a housing having an internal volume, a first surface, and an opening. The opening is capable of slidably receiving a turning loop and a fastener into the turning loop cover. The turning loop cover may further comprise a plurality of ribs extending from the first surface into the internal volume. The ribs are configured to attenuate a force acting upon the housing of the turning loop cover.

The ribs extending from the first surface are generally configured in a pattern that is sufficient to absorb the energy of a head impacting the first surface. The energy is absorbed as the ribs buckle toward the first surface. The rib pattern may be configured to have a center rib, two turning loop engaging ribs running parallel to the center rib that are spaced at a distance on either side of the center rib. Additionally two fastener engaging ribs may be implemented that run parallel to the center rib and are spaced between the turning loop engaging ribs and the center rib. This pattern may additionally comprise two intersecting ribs that run perpendicular to the center rib and intersecting the fastener engagement ribs. The ribs are also configured to engage the turning loop and the associated fastener in a manner that allows the ribs to buckle when a load is placed upon them.

The housing may alternatively comprise an internal volume, a first surface, and a second surface. The housing may be generally triangular or bell shaped. The first surface has a plurality of buckling members that extend into the internal volume of the housing. The second surface may be substantially parallel to the first surface and the second surface has a channel that defines a plurality of wings. The wings are integrally formed members of the housing and are cantilevered from the perimeter of the first surface toward the center of the housing. The wings are configured to compressively engage the turning loop. The wings may also have a plurality of perforations to engage a protrusion on the turning loop. The perforations and protrusions interlock to maintain the turning loop and turning loop cover engagement.

The turning loop cover and turning loop engagement may be further maintained by a compressive load placed on the turning loop by the wings. The compressive load is produced by an interference fit that occurs when the spacing between the ribs and the wings is smaller than the thickness of the turning loop. Thus, when the turning loop is inserted into the turning loop cover, the semi-flexible wings deflect to provide for the thickness of the turning loop.

The ribs may also have added features such as a ramped section of ribs near the opening in the housing. The ramped rib allows for the turning loop to enter the turning loop cover with a large tolerance. The ramped ribs could then guide the turning loop into a location between the ribs and the wings. The ribs may also comprise a ramped section that locks onto the fastener of the turning loop once the turning loop cover is fastened.

An alternative embodiment of the turning loop cover may include an attachment section pivotally attached to an attenuation section. The attachment section may include an abutment surface and a plurality of wings configured to slidably engage a turning loop. The attenuation surface may include a plurality of ribs configured to engage a turning loop and turning loop fastener. The attachment section and the attenuation section may include locking mechanisms, such as a snap-fit, to allow the two sections to be fastened together.

The features and advantages of the present invention will become more fully apparent from the following description and appended claims, or may be learned by the practice of the invention as set for hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention.

Figure 1:
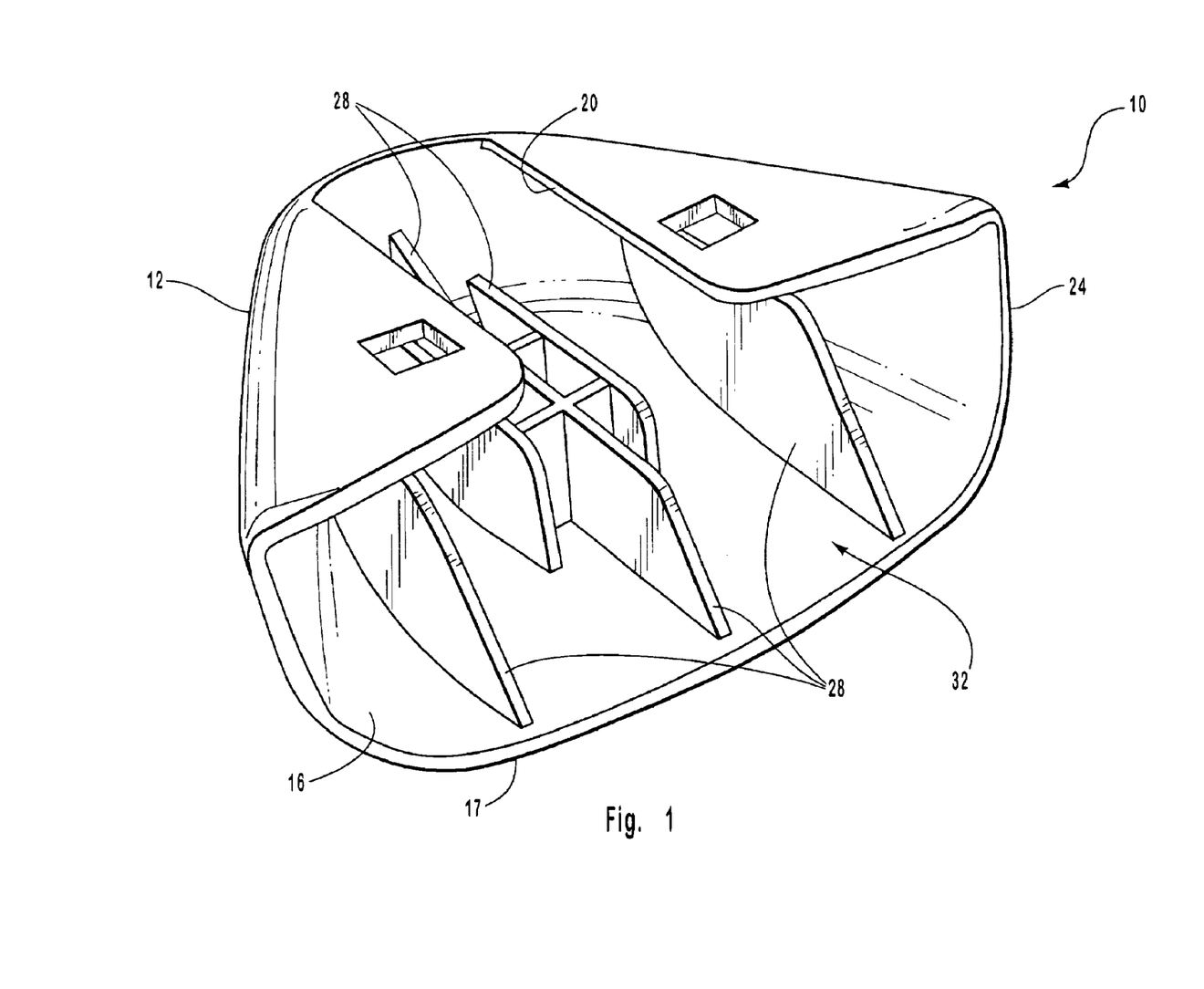
FIG. 1 is a perspective view an embodiment of a turning loop cover.

FIG. 1 is a perspective view of a turning loop cover 10 positioned to reveal the inner components of the apparatus. The turning loop cover 10 has a housing 12 that comprises a significant portion of the exterior of the turning loop cover 10. The housing 12 provides a general structure from which various features of the turning loop cover 10 may be incorporated. The housing 12 can be divided up into three sections: a first surface 16, a second surface 20, and partial enclosure wall 24. These three sections are typically integrally formed members or subcomponents of the housing 12. The housing 12 is divided into these sections simply for illustrative purposes. Together, the first surface 16, the second surface 20, and the partial enclosure wall 24 cooperate to define an internal volume of the housing 12.

The turning loop cover 10 also comprises a plurality of energy-absorbing members that are located with the internal volume of the housing 12. In the turning loop cover 10 illustrated in FIG. 1, the energy-absorbing members are a set of ribs 28 that extend from the first surface 16 of the housing 12. The ribs 28, as depicted, are one embodiment of many energy-absorbing members that can be placed in the housing 12. The ribs 28 are positioned to extend from the first surface 16 of the housing 12 into the internal volume. Upon receiving a load, the ribs 28 are configured to buckle toward the first surface 16. The ribs 28 may also attenuate a force by ripping and/or tearing. Typically, the load placed upon the turning loop cover 10 is created by a head impacting on the exterior of the turning loop cover 10.

The turning loop cover 10 is situated within an automobile cabin (not shown) to expose the exterior portion 17 of a first surface 16 to an impact from an object in the automobile cabin, such as the occupant's head. The energy of the impact is received by the first surface 16 and the energy is transferred to the energy-absorbing members. In order to sustain the impact and transfer the resulting force, the first surface 16 must be of sufficient strength and structure to avoid failure during impact. Further, to minimize injury to the occupant and maximize energy absorption, the first surface 16 is preferably a generally broad and smooth surface.

Additionally, the generally broad surface has the ability to absorb and disperse a concentrated load over a larger area of energy-absorbing members. Various curvatures and geometries may be applied to the first surface 16 to improve aesthetics and increase energy absorption. For example, the first surface 16 may be convex to add a further energy-absorbing feature that absorbs energy as the first surface 16 is deflected from convex to concave. The curvature of the first surface 16 also helps deflect a head away from the cover 10 during impact.

Figure 3:
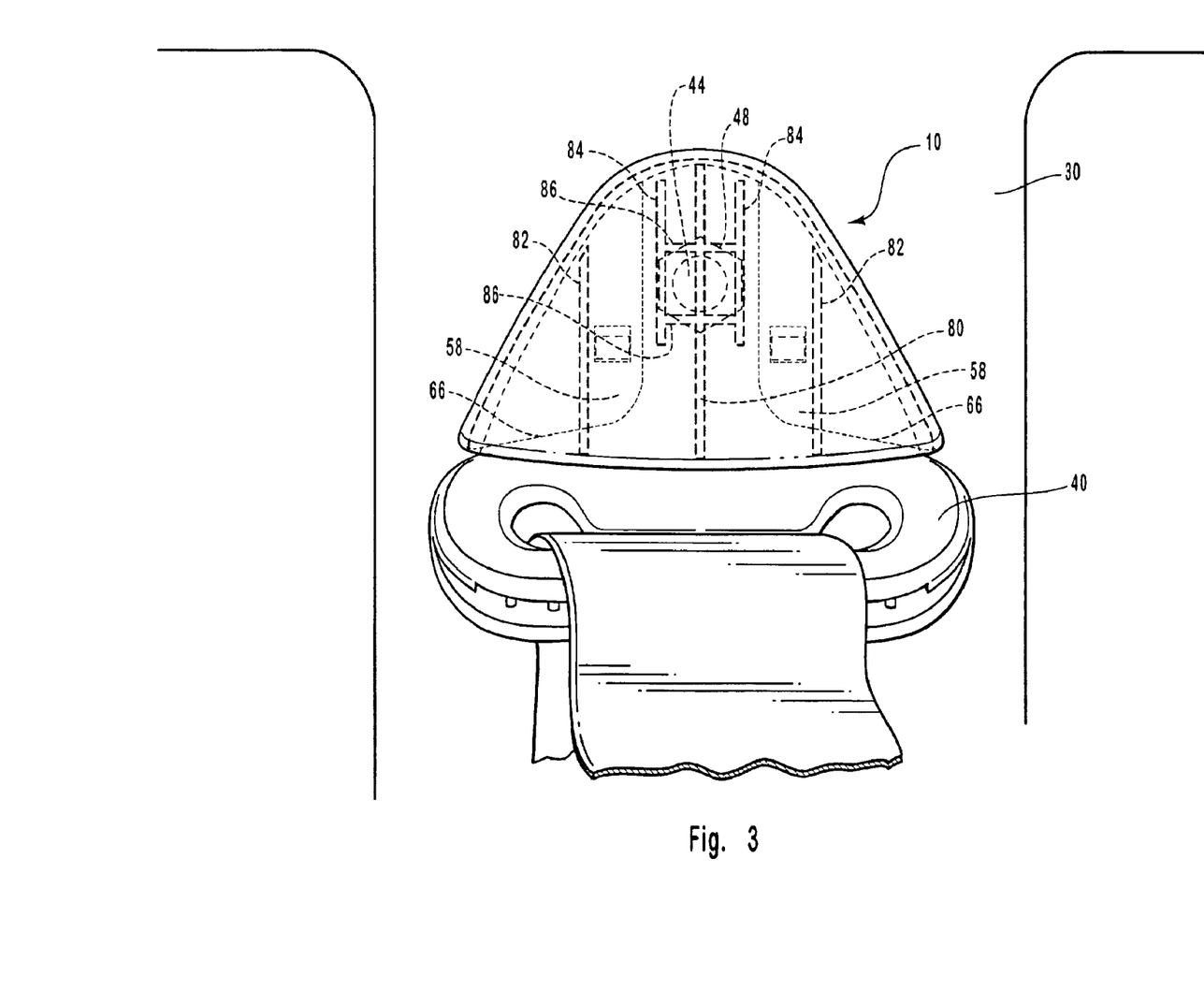
FIG. 3 is a side view of an engaged turning loop cover and turning loop with the internal structure of the turning loop cover shown in dashed lines.

The second surface 20 is situated substantially parallel to the first surface 16. The second surface 20 of the housing 12 generally faces away from the occupant and toward the structural members of the automobile. The structural member may be any member of an automobile where a turning loop could be fixed, such as a B pillar 30, as depicted in FIG. 3, a C pillar, or a D pillar. The first surface 16 and the second surface 20 are joined together at their perimeters by a partial enclosure wall 24. The wall 24 circumscribes a substantial portion of the housing 12, but as depicted in FIG. 1, the wall 24 may not wrap around the entire perimeters of the first surface 16 and second surface 20. The partial enclosure wall 24 generally has an opening 32 sufficient to receive a turning loop into the internal volume of the housing 12.

The partial enclosure wall 24 is depicted in FIG. 1 as being a solid member around the perimeters of the two surfaces 16, 20. However, the partial enclosure wall 24 need not be solid as depicted. The partial enclosure wall 24 may have various openings or gaps along its length and need only be solid to the extent that it is required to hold the first 16 and second 20 surfaces at a fixed distance. However, aesthetics may dictate that the partial enclosure wall 24 be solid to conceal the view of the internal turning loop and energy-absorbing components. Also, a solid wall could provide additional energy absorption characteristics over a non-solid wall by buckling or deflecting when receiving a load.

Alternatively the partial enclosure wall 24 may include walls that are not perpendicular to the first surface 16 and second surface 20 or even walls that are not readily identifiable. For example, the turning loop cover 10 could be a disk shaped member with gradually tapering edges that join the first surface 16 to the second surface 20. In such a turning loop cover 10, the partial enclosure walls would be the gradually tapering edges of the two surfaces 16, 20. Multiple other types of partial enclosure walls 24, the first surfaces 16, and the second surfaces 20 are possible in the turning loop cover 10 described herein. The components need only form a housing 12 that is capable of containing energy-absorbing members. The housing depicted in FIG. 1 is generally triangular or bell shaped. This triangular shape is generally dictated by the shape of the turning loop. However, the housing 12 of the turning loop cover 10 is capable of a large number of shapes and designs for various types of turning loops and aesthetic desings.

Figure 2:
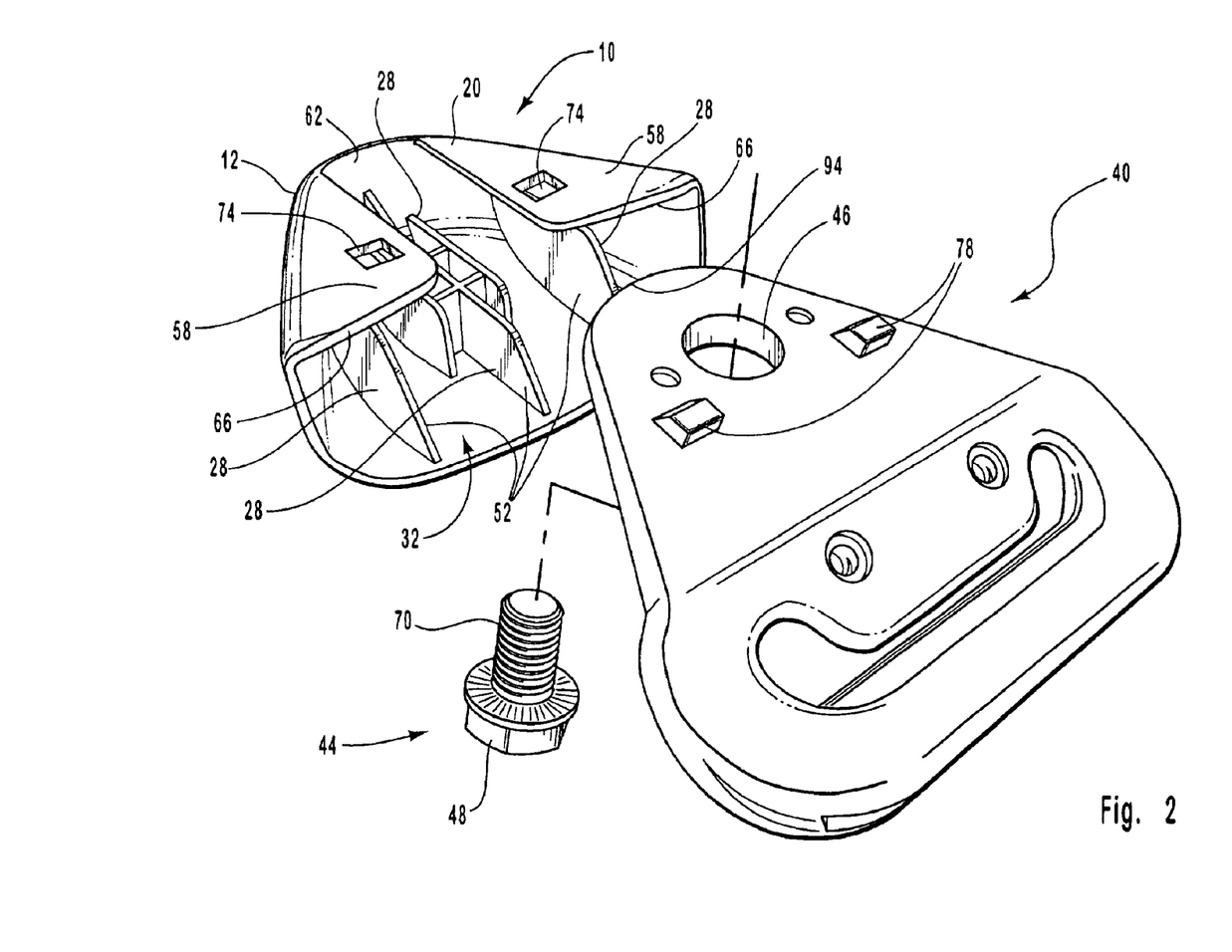
FIG. 2 is a perspective exploded assembly view of a turning loop cover and the turning loop.

Referring to FIG. 2, the turning loop cover 10 is depicted in a perspective exploded assembly view with the accompanying turning loop 40 and fastener 44. The system is shown as having a fastener 44 to be inserted through a hole 46 in the turning loop 40 whereby the turning loop 40 is fastened to the structure of the automobile. The turning loop cover 10 is then slidably attached to the turning loop 40, independent of the attachment of the turning loop 40 to the automobile structure. The turning loop cover 10 is slidably attachable, because it may be attached by a single direction motion without the need to manually deflect or move any of the members of the turning loop cover 10. The turning loop cover 10 is also self-guiding and self-locking. The self-guiding 'and self-locking features of the turning loop cover 10 allows the assembler to use only one hand and a single motion to install the turning loop cover 10. These features present a significant assembly time saving advantage that allows the turning loop cover 10 to be assembled independently of the turning loop 40 and allows easy access to the fastener head 48 for tightening purposes.

Once the turning loop 40 is fastened to the automobile structure, the turning loop cover 10 may be slidably and independently attached to the fastened turning loop 40. The independent attachment process allows for the turning loop cover 10 to be replaced without the need for removing the fastener 44 or the turning loop 40. This is beneficial in post production replacement, because an unskilled person could safely remove and reinstall a damaged cover 10 without the need to remove the fastener 44. Further, the independent attachment helps maintain the integrity of the fastener 44 and turning loop 40 from incorrect replacement or reattachment.

To attach the turning loop cover 10 to the turning loop 40, the turning loop 40 is inserted into the opening 32 of the housing 12. In the turning loop cover depicted in FIG. 2, the opening 32 is sized to the height and width of the sides of the housing 12. However, the opening 32 may be no more than a thin slot that is approximately the size of the cross-section of the turning loop 40. This may be advantageous where the opening is noticeably visible from the automobile cabin. This thin slot could be more aesthetically pleasing by revealing a minimal amount of the systems functional components. Nonetheless, while a thin slot opening 32 does provide some aesthetic advantages, it may also increase the difficulty in attaching the turning loop cover 10 to the turning loop 40. A larger opening 32, as depicted in FIG. 2, will allow for a large tolerance in assembling the turning loop cover 10. However, a larger opening 32 may decrease the energy absorption properties of the turning loop cover 10.

Attachment of the turning loop cover 10 may be further assisted through the use of a plurality of ramped ribs 52. The ramped ribs 52 allow for an area the size of the opening 32 to be used to begin the attachment of the turning loop cover 10 to the fastened turning loop 40. For example, the turning loop 40 can enter the opening 32 of the housing 12 at a location near the first surface 16. At this location, the turning loop 40 will abut the ramped ribs 52. As the turning loop 40 is forced against the ramped ribs 52, the ribs 52 will guide the turning loop 40 toward the second surface 20 and into the engagement location which is between the second surface 20 and the ribs 28. This ramped ribs 52 feature allows for larger assembly tolerances and shorter assembly time.

Once the turning loop 40 is inserted into the turning loop cover 10, the two members may be locked together. In one embodiment, the turning loop cover 10 places a compressive load upon the turning loop 40 to assist in maintaining the engagement. The compressive load may be created by a plurality of wings 58 which are defined by a channel 62 in the second surface 20, the wings 58 are thus features of the second surface 20. The channel 62 typically runs in the sliding engagement direction and bisects the second surface 20. The wings 58 may extend from the perimeter of the second surface 20 and be cantilevered over the ribs 28. The cantilevered structure of the wings 58 allows for a degree of flexibility that is partially determined by the material from which the turning loop cover is made and is also partially determined by the distance that the edge of the wings 58 are located from the cantilevered point. This allows the wings 58 to resist deflection in an elastic manner so that the wings may apply a compressive load on the member producing the deflection.

In FIG. 2, the wings 58 are fixed above the ribs 28 at a distance that is less than the thickness of the turning loop 40. Thus, as the turning loop 40 is inserted into the turning loop cover 10, the wings 58 deflect away from the ribs 28 to allow the turning loop 40 to be inserted. Once the turning loop 40 is inserted, the elastic nature of the wings 58 provides a continuous resistance to the turning loop 40 induced deflection. Consequently, the wings 58 place a compressive load on the turning loop 40. This type of engagement is referred to as an interference fit because the thickness of the turning loop 40 is larger than the distance between the wings 58 and the ribs 28. The wings 58 may be of any number of shapes depending upon the application in which they are used. In FIG. 2, the wings 58 have an angled edge 66 near the opening 32. The angled edges 66 facilitate assembly in much the same manner as the ramped ribs 52. The angled edges 66 of the wings 58 help to guide the shaft 70 of the fastener 44 when attaching the turning loop cover 10 to the turning loop 40. As the fastener enters the opening 32 of the turning loop cover 10, the angled edges 66 will abut the fastener 44 and oriented it to the center of the channel 62. This allows for the original alignment of the fastener 44 and the turning loop cover 10 to be aligned by a determined tolerance.

The wings 58 may take various forms and shapes but still remain within the scope of this invention. For example, the wings 58 need not be symmetrical, nor in the same shape as depicted in FIG. 2. Rather the wings may be of any shape or form so long as they operate in a similar manner as the wings 58 depicted in the figures. Generally, the wings 58 operate to provide a compressive load on the turning loop 40 between the ribs 28 and the wings 58. The compressive load helps to maintain the turning loop cover 10 and turning loop 40 engagement. Therefore, any type of wing that provides a compressive load between the turning loop cover 10 and the turning loop 40 is within the scope of this application. However, other turning loop covers 10 may not require a compressive load by the wings 58. The wings 58 may provide a stop to prevent the turning loop 40 and the turning loop cover 10 from disengaging, yet not be compressively loaded.

Further, the wings 58 may also provide a location in which the turning loop cover 10 may be engaged or locked. The wings 58, as depicted in FIG. 2, have perforations 74 in the surfaces that are configured to engage protrusions 78 of the turning loop 40. As the turning loop 40 is inserted into the turning loop cover 10, the protrusions 78 slide under the wings 58 and then lock into the perforations 74 when the two members are completely engaged. The protrusions 78 may additionally have over hanging lips that extend over the top portion of the wing 58 to help maintain engagement. Alternatively, the protrusions 78 may be located on the turning loop cover 10 and the perforations 74 may be placed on the turning loop 40.

The turning loop cover 10 is also capable of various other locking mechanisms. One example of a locking mechanism is a rib 28 that is aligned in the engagement direction, parallel to the channel, may have a raised ramped section. As the turning loop cover 10 slidably attaches to the fastener 44 and the turning loop 40, the head 48 of the fastener 44 will engage a lower portion of the ramp. As the turning loop 40 and the turning loop cover 10 further engage, the fastener head 48 will progress up to a higher section of the ramp. Once at the end of the ramp, the fastener head 48 will drop off the end of the ramp and into a low section of the rib 28. The end of the ramp from which the fastener head 48 is dropped, will function as a stop to prevent the turning loop cover 10 from slidably disengaging the turning loop 40. This engagement is similar to a snap fit type engagement. Another locking method may include notches on the top or edges of the turning loop 40 that engage tabs or protrusions in the turning loop cover 10. The tabs in the turning loop cover 10 would then snap into the notches of the turning loop 40 to maintain the engagement.

Once the turning loop 40, the fastener 44, and the turning loop cover 10 are engaged, the system is configured to absorb energy from an impact. The turning loop cover 10 in FIG. 2 employs a plurality of buckling ribs 28 to absorb and disperse energy from an impacting object. Currently, the United States National Highway Traffic Safety Administration (NHTSA) requires that the Head Impact Criteria (HIC) value not exceed a value of 1000. The HIC value is a mathematical formula that estimates the amount of damage that can occur to a human head upon impact with an object. The HIC value is calculated by the following equation:

$$HIC = \left[ \frac{1}{(t_2 - t_1)} \int_{t_1}^{t_2} a\, dt \right]^{2.5} \cdot (t_2 - t_1)$$

wherein
a=The resultant head acceleration expressed as a multiple of gravity;
$t_2-t_1$=Any two time points during the impact that are separated by no more than 36 millisecond time intervals.

The number indicated by the HIC value may be characterized by crushed sections of the skull or by injury to the surrounding skin and tissue. The objective of a turning loop cover 10 is to minimize the amount of damage to a human when the head impacts the cover 10. While the NHTSA requires that a turning loop cover 10 have an HIC value of less than 1000, some automobile manufactures requires an even lower value than 1000. The turning loop cover 10 disclosed herein is capable of having an HIC value of less than 600 when tested in the vehicle for which it was designed.

FIG. 3, illustrates the positioning of the individual ribs 28 in relationship to the fastener 44 and the turning loop 40 when the system is assembled. The turning loop cover 10 has four different types of ribs 28: A center rib 80, two turning loop engagement ribs 82, two fastener engagement ribs 84, and two intersection ribs 86. The plurality of ribs 80, 82, 84, 86 are configured to engage the turning loop 40 and the fastener 44.

The turning loop engagement ribs 82 are sized to a height sufficient to engage the turning loop 40 when assembled. Generally, the turning loop engagement ribs 82 are compressed against the turning loop 40 in turning loops cover 10 that employs compressive wings 58, however such an engagement is not required. The turning loop 40 may be located in a position above the turning loop engagement ribs 82, but not actually in contact with them. The turning loop engagement ribs 82 need only be configured to engage the turning loop 40 when receiving a determined impact load.

Similar to the turning loop engagement ribs 82, the fastener head 48 of the fastener 44 is engaged by the center rib 80, the two fastener engagement ribs 84, and the two intersection ribs 86. The fastener engagement ribs 84 are spaced at a distance from the center rib 80. Preferably, the fastener engagement ribs 84 are spaced at a distance not wider than the width of the fastener head 48. The two intersection ribs 86 are likewise preferably spaced at a distance not wider than the fastener head 48 and intersect the fastener engagement ribs 84. These ribs 28 need not actually be in contact with the fastener head 48, so long as the ribs 28 are configured to engage the fastener head 48 during an impact.

Various configurations of rib patterns may be implemented to create an energy absorbing structure capable of having a HIC value below 1000. The central design characteristic of the ribs 28 is that they buckle and collapse when a load is placed on top of the rib. The buckling and collapsing of the ribs 28 will preferably attenuate the force until the ribs 28 have collapsed onto the first surface 16. Factors in designing and selecting a rib pattern may include the rib height, thickness, cross-sectional shape, quantity, material and material structure. By varying these factors, a large number of rib patterns may be created to attenuate the force of a head impacting a turning loop cover 10.

The slidably attached turning loop cover 10 is also versatile enough to employ a number of energy-absorbing members within the internal volume of the housing 12. Preferably, the energy-absorbing members will be of the type capable of attenuating a compressive load or force, such as occurs when a head impacts the first surface 16 and compresses the energy-absorbing members into the turning loop 40. Variations of energy-absorbing members, such as an arched beam that deflects, are easily incorporated into the present turning loop cover 10 with minimal design changes. Other energy-absorbing members may include a collapsible foam that has a large number of collapsible vacancies to attenuate the impact. Alternatively, a two-member interference fit system may be implemented. The interference fit may employ a larger protrusion that is forced into a smaller hole. As the large protrusion is forced into the smaller hole, energy is absorbed in expanding the hole or compressing the protrusion. These and other types of energy-absorbing members can be readily implemented into the slidable turning loop cover 10.

While the turning loop cover 10 can employ a number of energy-absorbing members, the energy-absorbing members will not require any additional steps to manufacture and attach the energy-absorbing members. The turning loop cover 10 as depicted in the figures may be manufactured with an inexpensive, single shot injection molding process. Injection molding provides the benefits of being a single step process that is capable of rapidly manufacturing a three-dimensional object from a number of plastic and metal materials. Presently, plastics are preferred because of their strength and flexibility.

Referring once again to FIG. 2, the present invention can be simply illustrated by demonstrating the assembly and operation of the turning loop cover 10. The fastener 44 is first inserted into the turning loop hole 46 and then independently fastening the turning loop 40, via the fastener 44, to the automobile structure. Once the turning loop 40 is fastened, the turning loop cover 10 is attached onto the turning loop 40. The turning loop cover 10 is attached to the turning loop 40 as the opening 32 is placed onto the leading edge 94 of the turning loop 40. The turning loop cover 10 may be placed onto the leading edge 94 at any location of the opening 32, because of the self-aligning members.

As the turning loop cover 10 is placed onto the turning loop 40, the ramped ribs 52 and the angled edges 66 of the wings 58 guide the turning loop cover 10 to the proper alignment with the turning loop 40 and the fastener 44. While the turning loop cover 10 is being mounted onto the turning loop 40, the protrusions 78 on the turning loop 40 slide under the wings 58 until they lock into the perforations 74. The turning loop cover 10 remains engaged with the turning loop 40 by the wings 58 applying a compressive load onto the turning loop 40 against the ribs 28, thus maintaining the protrusion to perforation engagement. Alternatively, wings 58 may have protrusions 78 and the turning loop 40 may have perforation 74.

Once the turning loop cover 10 and the turning loop 40 are locked together, they are in a configuration to attenuate the impact of a head or other object striking the first surface 16. A head impacting a turning loop cover 10 will typically occur during a side impact collision. An impact on either side of the automobile may cause the occupant's head to accelerate toward the turning loop cover 10 and impact the first surface 16. The force of the head will cause the first surface 16 to deflect toward the second surface 20. This deflection will apply a force on the ribs 28, compressing the ribs 28 against the turning loop 40 and the fastener 44. At a force that is determined by the physical characteristics of the ribs 28 and the vehicle structure, the ribs 28 will buckle. The kinetic energy that was present in the occupant's head will be attenuated by transferring that energy from the motion into the buckling of the ribs 28. After the impact, the turning loop cover 10 can be easily replaced by deflecting the wings 58 away from the turning loop 40 so that the protrusions 78 disengage the perforations 74. The turning loop cover 10 may then be slid-off of the turning loop 40 without the need to remove the turning loop 40 or the fastener 44. A new turning loop cover 10 may be simply attached as described above.

Figure 4:
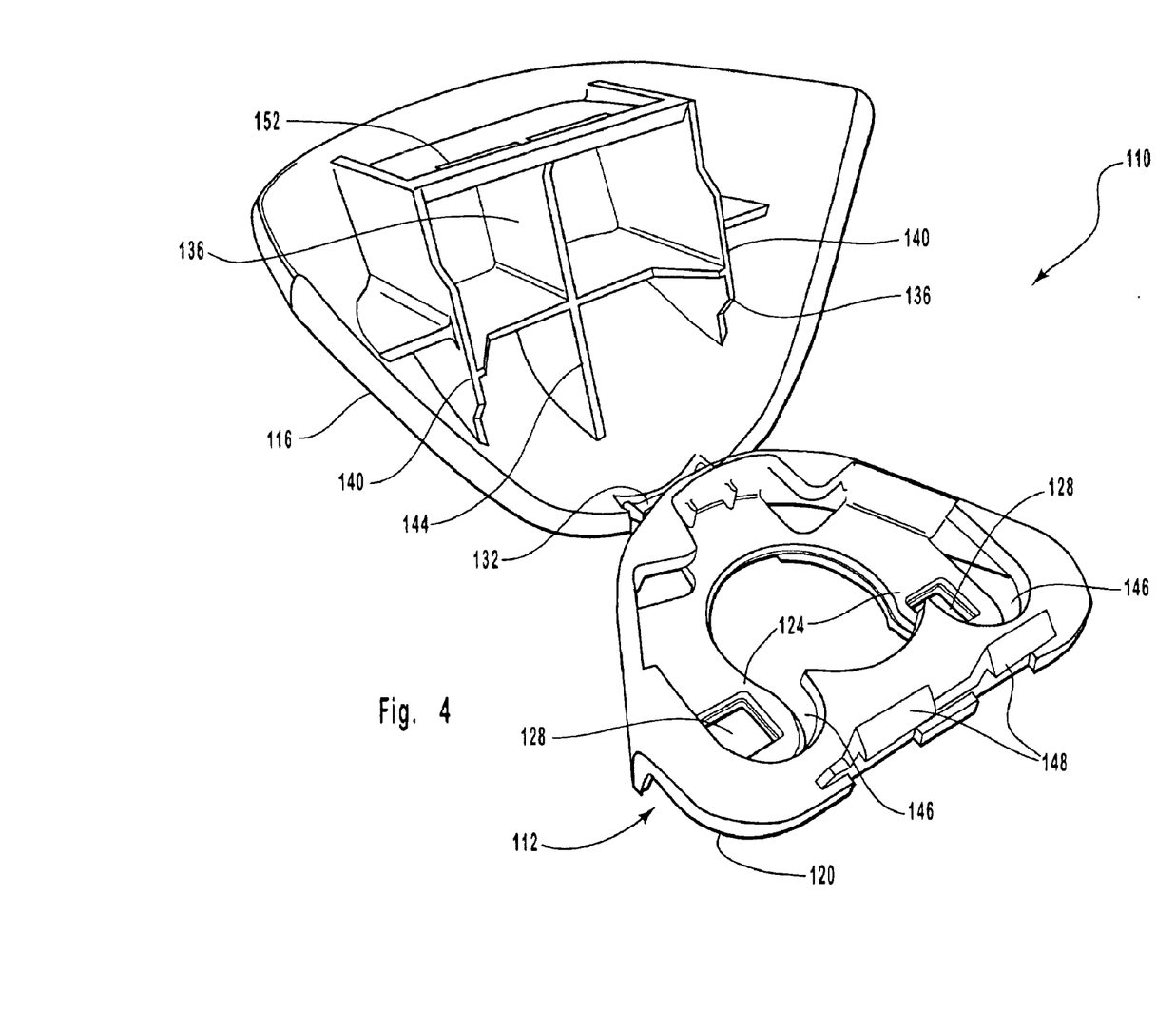
FIG. 4 is a perspective view of another embodiment of the turning loop cover.

Referring now to FIG. 4, an alternative embodiment of the turning loop cover 110 is illustrated. The turning loop cover 110 is comprised of an attachment section 112 and an attenuation section 116. The attachment section 112 may have an abutment surface 120 and a plurality of wings 124 that are partially deflectable. The abutment surface 120 and the wings 124 may be spaced at a distance that is generally equal to the thickness of a turning loop. The wings 124 may include perforations 128 configured to engage corresponding protrusions located on the turning loop (not shown).

The attachment section 112 may be pivotally attached to the attenuation section 116. The pivotal attachment may be achieved by a compliant joint 132 that is created during a molding process. The attenuation section may include a plurality of ribs 136 that are similar to ribs illustrated in previous embodiments. The ribs 136 may include turning loop engagement ribs 140 that are configured to engage the turning loop when the turning loop cover 110 is closed. The attenuation section 116 may also include fastener engagement ribs 144 that are configured to engage the head of a fastener when the turning loop cover 110 is closed.

The turning loop engagement ribs 140 and the fastener engagement ribs 144 are configured to attenuate energy by buckling, tearing, or ripping during an application of a force. Additionally, portions of the abutment surface 120 may also bend or deflect during an application of a force to attenuate energy. Furthermore, open sections 146 may be located in the abutment surface 120 to allow the turning loop engagement ribs 140 to be placed in direct contact with the turning loop.

The turning loop cover 110 may be installed by first slidably attaching the attachment section 112 onto a turning loop. As the turning loop slides into the attachment section 112, the wings 124 will deflect to allow the perforations 128 in the wings 124 to lock to protrusions in the turning loop. Once the attachment section 112 is locked to the turning loop, the turning loop cover 110 may be attached to an automobile by a fastener. Once the turning loop cover 110 is fastened to the automobile, the attenuation section 116 may be closed and locked to the attachment section 112.

The attachment section 112 may attach to the attenuation section 116 through a snap-fit engagement. The attachment section 112 may include a plurality of male snap-fit engagement members 148. The male snap-fit engagement members 148 may have corresponding female snap-fit engagement openings 152 in the attenuation section 116. When the attenuation section 116 is closed onto the attachment section 112, the snap-fit engagement will lock. Alternatively, the male snap-fit engagement members 148 and the female snap-fit engagement openings 152 may be located on the opposing structures.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A turning loop cover configured to attach to a turning loop fastened to an automobile structural member, the turning loop cover comprising:
    a housing having an internal volume, and a first surface;
    a plurality of ribs extending from the first surface into the internal volume, the ribs configured to attenuate a force acting upon the housing, the ribs being configured in a pattern comprising a center rib, two turning loop engaging ribs running parallel to the center rib and spaced at a distance on either side of the center rib, two fastener engaging ribs running parallel to the center rib and spaced between the turning loop engaging ribs and the center rib, and two intersecting ribs running perpendicular to the center rib and intersecting the fastener engagement ribs; and
    an opening in the side of the housing whereby the turning loop cover can slidably engage the fastened turning loop.

2. The turning loop cover, as recited in claim 1, wherein the rib configuration is capable of attenuating the force by buckling.

3. The turning loop cover, as recited in claim 1, wherein the center rib, the fastener engaging ribs, and the intersecting ribs extend from the first surface to a height sufficient to engage the turning loop fastener.

4. The turning loop cover, as recited in claim 1, wherein the turning loop engaging ribs extend from the first surface to a height sufficient to engage the turning loop.

5. The turning loop cover, as recited in claim 1, wherein two turning loop engagement ribs and the center rib are ramped at the opening of the housing.

6. The turning loop cover, as recited in claim 1, wherein the housing compressively engages the turning loop.

7. The turning loop cover, as recited in claim 1, wherein the head impact criteria is less than 1000.

8. The turning loop cover, as recited in claim 1, wherein the turning loop cover is generally bell shaped.

9. A turning loop cover capable of engaging a turning loop fastened to an automobile structural member, the turning loop cover comprising:
    a housing having an internal volume, a first surface, and a second surface;
    a plurality of ribs extending from the first surface of the housing, the ribs configured to attenuate a force acting upon the housing; and
    a channel in the second surface of the housing opposite the ribs, the channel defining a plurality of wings, the wings configured to compressively engage the turning loop.

10. The turning loop cover, as recited in claim 9, wherein the rib configuration is capable of attenuating the force by buckling.

11. The turning loop cover, as recited in claim 9, wherein the rib configuration is capable of attenuating the force by ripping.

12. The turning loop cover, as recited in claim 9, wherein the rib configuration is capable of attenuating the force by tearing.

13. The turning loop cover, as recited in claim 9, wherein at least one wing has a perforation to engage a protrusion on the turning loop.

14. The turning loop cover, as recited in claim 9, wherein the turning loop has a perforation to engage a protrusion on the wing.

15. The turning loop cover, as recited in claim 9, wherein the wings are semi-flexible.

16. The turning loop cover, as recited in claim 9, wherein the wings are capable of engaging the turning loop and fastener in an interference fit.

17. The turning loop cover, as recited in claim 9, wherein the second surface of the housing is capable of locking to the turning loop fastener to maintain an engagement.

18. The turning loop cover, as recited in claim 9, wherein the turning loop cover is generally triangular shaped.

19. The turning loop cover, as recited in claim 9, wherein the turning loop cover is capable of being engaged to the turning loop by a single sliding motion.

20. A turning loop cover configured to engage a turning loop fastened to an automobile structure, the turning loop cover comprising:
    a housing having an internal volume, a first surface, and a second surface, wherein the first surface is substantially parallel to the second surface and the first and second surfaces are connected via a partial enclosure wall;
    a plurality of ribs extending from the first surface and into the internal volume;
    an opening in the housing configured to slidably receive the fastened turning loop; and
    a channel in the second surface defining a plurality of wings that are configured to bias the turning loop against at least one of the ribs.

* * * * *

UNITED STATES PATENT AND TRADEMARK OFFICE
CERTIFICATE OF CORRECTION

PATENT NO. : 6,929,286 B2 Page 1 of 1
APPLICATION NO. : 10/228363
DATED : August 16, 2005
INVENTOR(S) : Bertelle et al.

It is certified that error appears in the above-identified patent and that said Letters Patent is hereby corrected as shown below:

Title Page:

At column 1, please add the following after "(73) Assignee: Autoliv ASP, Inc., Ogden UT (US)":

DaimlerChrysler Corporation, Auburn Hills, MI (US)

Signed and Sealed this

Twenty-ninth Day of April, 2008

JON W. DUDAS
*Director of the United States Patent and Trademark Office*